(12) United States Patent
Son et al.

(10) Patent No.: US 11,995,284 B2
(45) Date of Patent: May 28, 2024

(54) TOUCH SENSOR AND LAMINATE INCLUDING THE SAME

(71) Applicant: DONGWOO FINE-CHEM CO., LTD., Iksan-si (KR)

(72) Inventors: Dongjin Son, Asan-si (KR); Junha Kim, Pyeongtaek-si (KR)

(73) Assignee: DONGWOO FINE-CHEM CO., LTD., Iksan-si (KR)

(*) Notice: Subject to any disclaimer, the term of this patent is extended or adjusted under 35 U.S.C. 154(b) by 0 days.

(21) Appl. No.: 18/018,768

(22) PCT Filed: Aug. 17, 2021

(86) PCT No.: PCT/KR2021/010885
§ 371 (c)(1),
(2) Date: Jan. 30, 2023

(87) PCT Pub. No.: WO2022/045660
PCT Pub. Date: Mar. 3, 2022

(65) Prior Publication Data
US 2023/0305667 A1   Sep. 28, 2023

(30) Foreign Application Priority Data

Aug. 24, 2020 (KR) .................. 10-2020-0105991
Jul. 1, 2021 (KR) .................. 10-2021-0086597

(51) Int. Cl.
*G06F 3/041*   (2006.01)
*G06F 3/044*   (2006.01)

(52) U.S. Cl.
CPC .......... *G06F 3/0448* (2019.05); *G06F 3/0445* (2019.05); *G06F 2203/04111* (2013.01)

(58) Field of Classification Search
None
See application file for complete search history.

(56) References Cited

U.S. PATENT DOCUMENTS 8,179,381 B2    5/2012   Frey et al.
2015/0160758 A1*  6/2015   Chen .................. G06F 3/0445
                                                         345/174

FOREIGN PATENT DOCUMENTS

| JP | 2004082713 A | * | 3/2004 | ............ B05D 5/083 |
|---|---|---|---|---|
| KR | 10-2010-0095886 A | | 9/2010 | |
| KR | 10-2015-0022215 A | | 3/2015 | |
| KR | 10-1517458 B1 | | 4/2015 | |
| KR | 10-1572432 B1 | | 11/2015 | |
| KR | 10-1879220 B1 | | 7/2018 | |
| KR | 10-2018-0093339 A | | 8/2018 | |

(Continued)

OTHER PUBLICATIONS

Translation of JP-2004082713-A into English; Hayashida. (Year: 2004).*

(Continued)

*Primary Examiner* — Brian M Butcher
(74) *Attorney, Agent, or Firm* — Sughrue Mion, PLLC

(57) ABSTRACT

A touch sensor has a base layer and an electrode layer. The electrode layer includes a first transparent oxide layer formed on the base layer, a conductive metal layer formed on the first transparent oxide layer, and a second transparent oxide layer formed on the conductive metal layer and has a plurality of through-holes with the same shape and spacing.

12 Claims, 6 Drawing Sheets

(56) References Cited

FOREIGN PATENT DOCUMENTS

| | | |
|---|---|---|
| KR | 10-2018-0101751 A | 9/2018 |
| KR | 10-2020-0056690 A | 5/2020 |
| KR | 10-2020-0056938 A | 5/2020 |

OTHER PUBLICATIONS

International Search Report for PCT/KR2021/010885 dated Nov. 23, 2021 [PCT/ISA/210].

* cited by examiner

【Figure 1A】
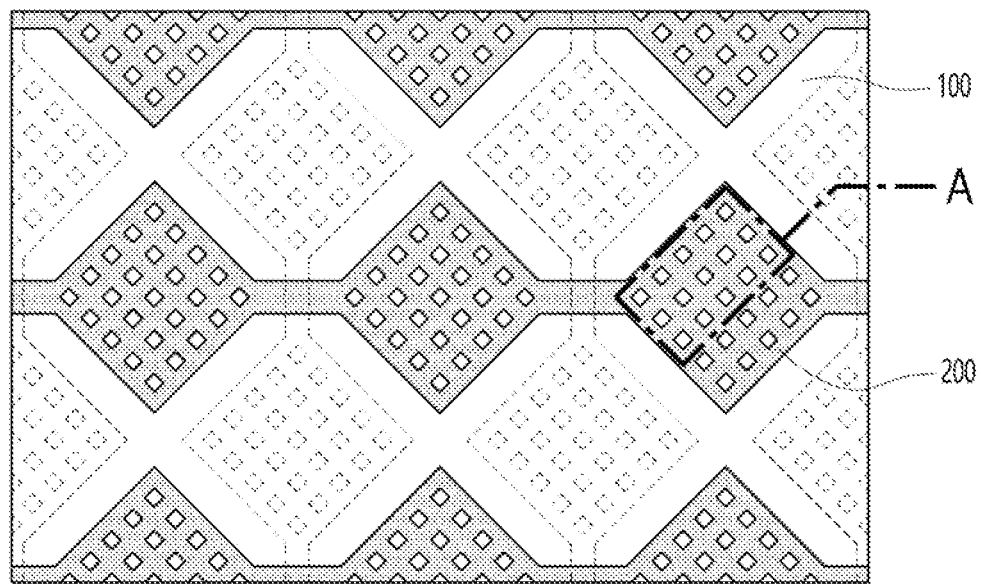
【Figure 1B】
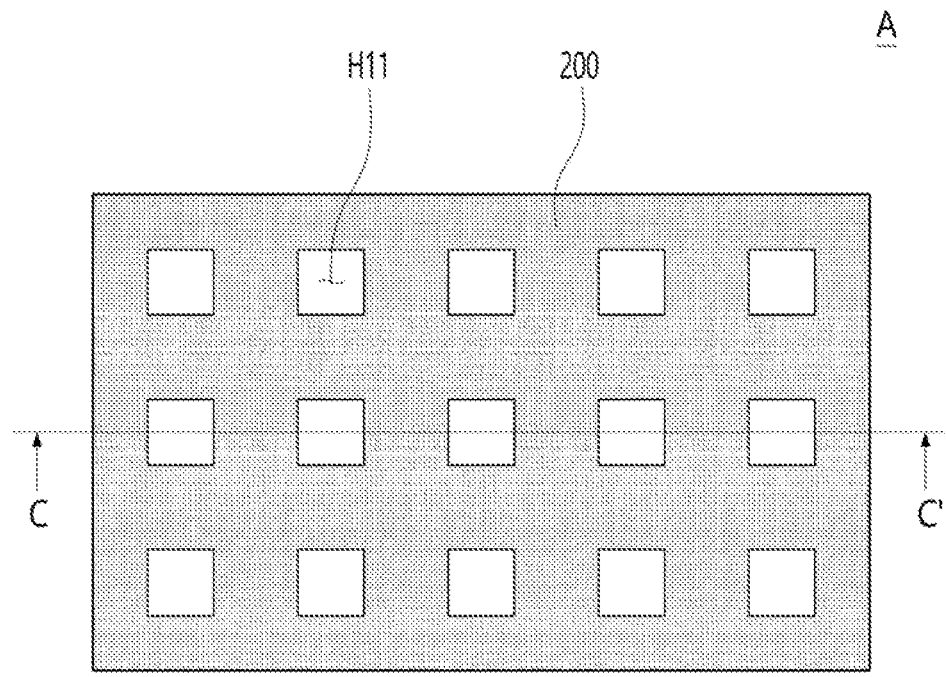

[Figure 1C]
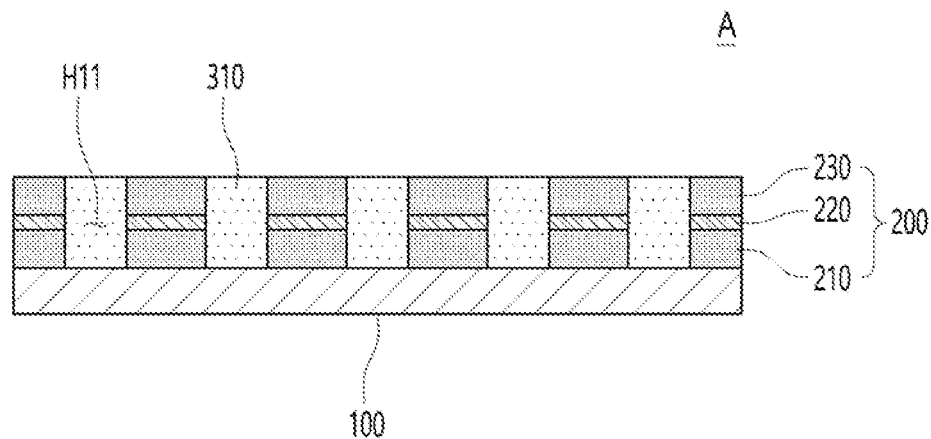
[Figure 2]
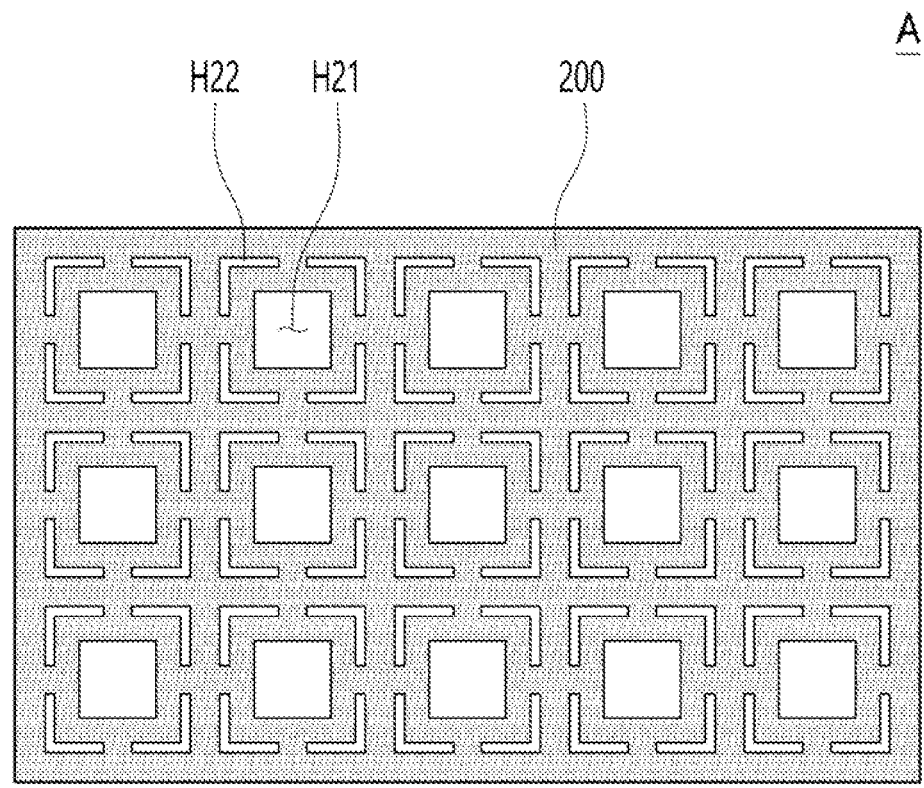

[Figure 3]
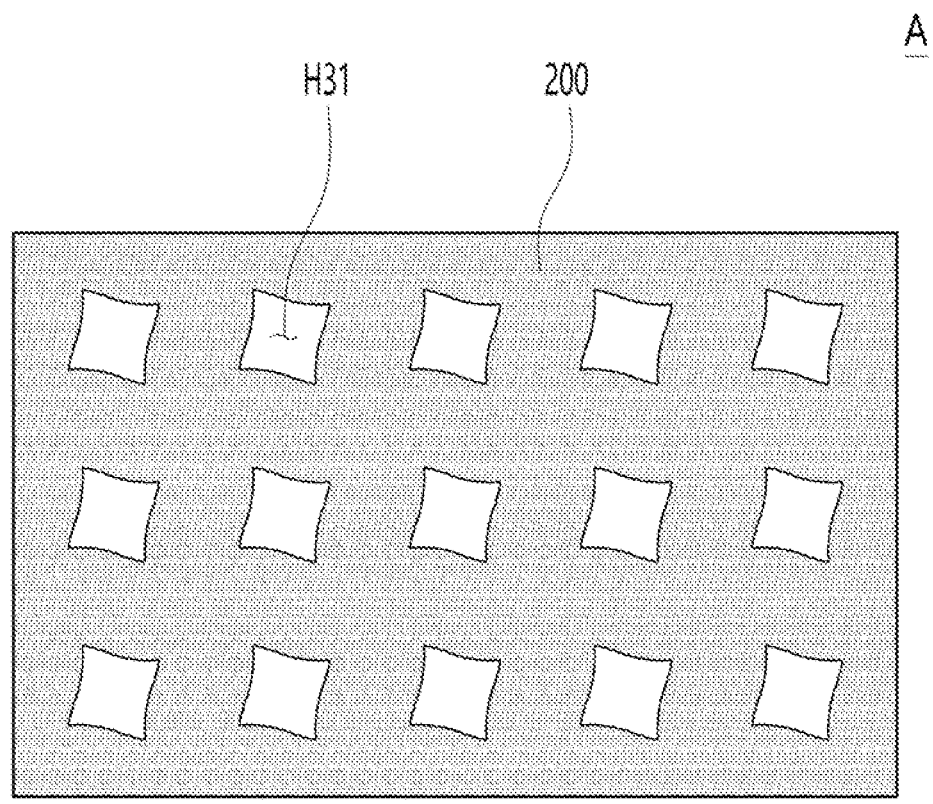

[Figure 4]
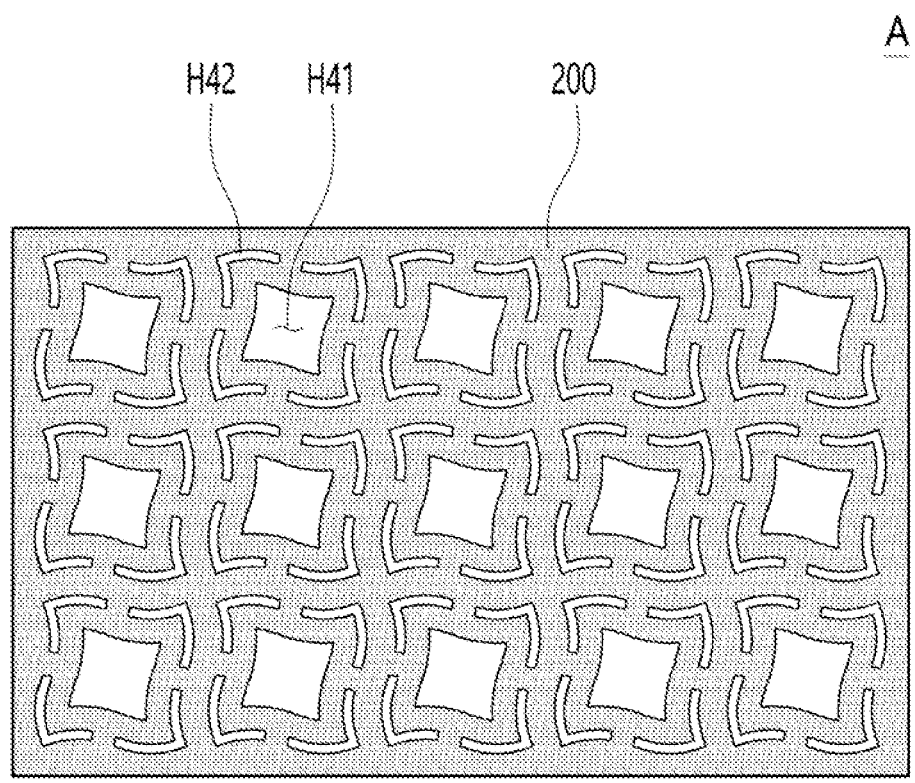

[Figure 5A]
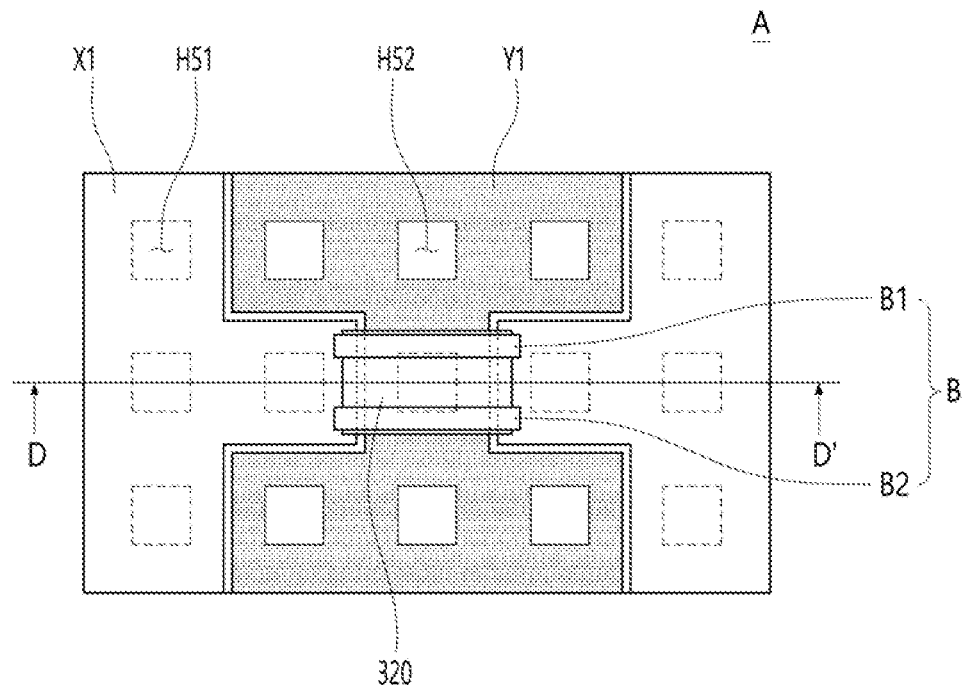
[Figure 5B]
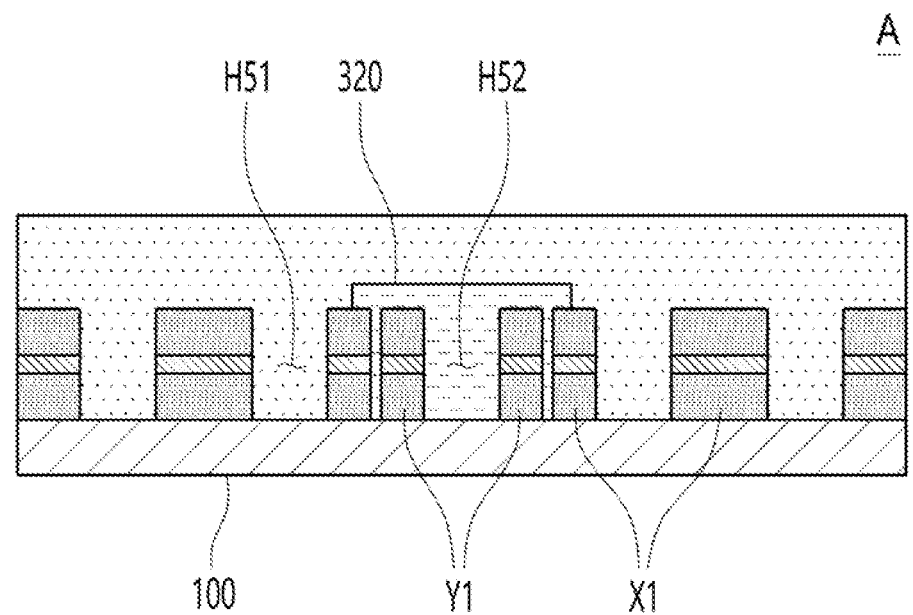

【Figure 6】
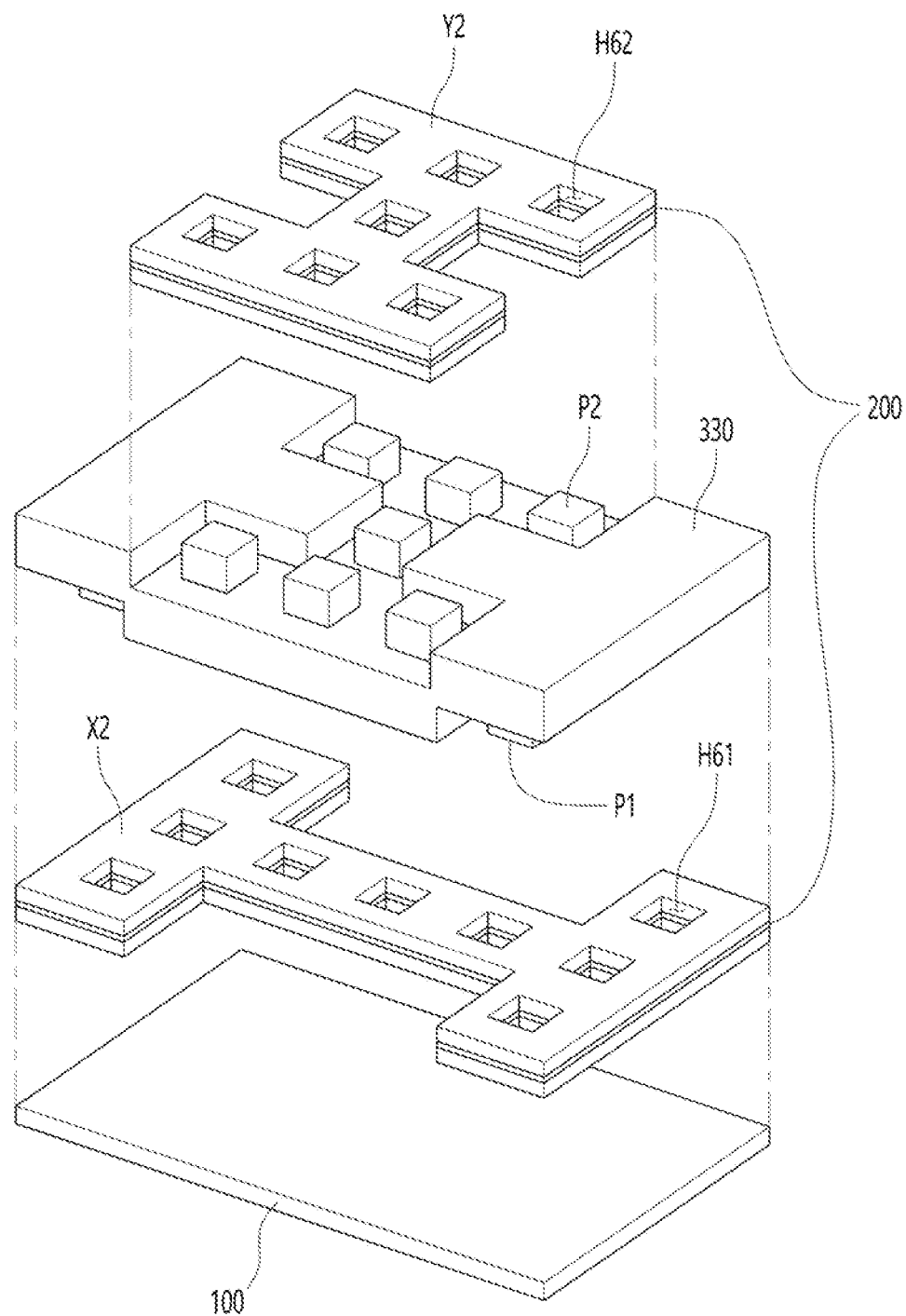

TOUCH SENSOR AND LAMINATE INCLUDING THE SAME

CROSS REFERENCE TO RELATED APPLICATIONS

This is a National Stage of International Application No. PCT/KR2021/010885 filed Aug. 17, 2021, claiming priority based on Korean Patent Application No. 10-2020-0105991 filed Aug. 24, 2020 and Korean Patent Application No. 10-2021-0086597 filed Jul. 1, 2021, the contents of all of which are incorporated herein by reference in their entirety.

TECHNICAL FIELD

The present invention relates to a touch sensor. Particularly, the present invention relates to a touch sensor capable of simultaneously achieving low resistance and high transmittance by using a conductive layer formed by inserting a conductive metal layer between transparent oxide layers, a so-called OMO (Oxide/Metal/Oxide) laminate, as an electrode layer.

BACKGROUND ART

A touch sensor includes a plurality of X-axis electrode cells arranged in X-axis direction and a plurality of Y-axis electrode cells arranged in Y-axis direction. In the touch sensor, when transmittance is important, a transparent metal oxide is used as a main material of an electrode layer, and when conductivity is important, a conductive metal having high conductivity is used as the main material. Furthermore, even when a conductive metal is used, the conductive metal is deformed into a mesh form in order to increase transmittance. U.S. Pat. No. 8,179,381 (touch screen sensor) discloses an example of using such a mesh-shaped conductive metal for an electrode layer.

However, when the electrode layer made of a conductive metal in a mesh form is used as in U.S. Pat. No. 8,179,381, low resistance and good transmittance can be secured, but it is difficult to block or minimize the moire phenomenon compared to the case of using a transparent oxide.

DISCLOSURE OF INVENTION

Technical Problem

The present invention is to solve the above problems of the prior art and an object of the present invention is to provide a touch sensor capable of simultaneously achieving low resistance and high transmittance.

Another object of the present invention is to provide a touch sensor capable of blocking or minimizing the moire phenomenon.

Yet another object of the present invention is to provide a touch sensor that can be easily applied to a large area implementation.

Technical Solution

A touch sensor of the present invention to achieve such objects may include a base layer and an electrode layer formed on the base layer.

The base layer is a substrate on which the electrode layer is formed, and may be composed of a base film, a laminate of a separation layer/a protective layer, or the like.

The electrode layer may include a first transparent oxide layer formed on the base layer, a conductive metal layer formed on the first transparent oxide layer, and a second transparent oxide layer formed on the conductive metal layer. The electrode layer may have a plurality of through-holes with the same shape and spacing.

In the touch sensor of the present invention, the through-hole may have a polygonal or curved shape.

In the touch sensor of the present invention, when the through-hole has a polygonal shape, an edge of the polygon may be bent.

In the touch sensor of the present invention, the through-hole may include a curved or polygonal main through-hole and a linear auxiliary through-hole intermittently surrounding the main through-hole outside the main through-hole.

In the touch sensor of the present invention, the electrode layer may include a first electrode layer having a plurality of first through-holes formed on the base layer and having same shape and spacing, an insulation layer formed on the first electrode layer, and a second electrode layer having a plurality of second through-holes formed on the insulation layer and having same shape and spacing but not overlapping the first through-holes.

In the touch sensor of the present invention, the insulation layer may fill the first through-hole and the second through-hole.

In the touch sensor of the present invention, portions of the first through-holes and the second through-holes may overlap in a region where the first electrode layer and the second electrode layer intersect.

In the touch sensor of the present invention, the electrode layer may have a transmittance of 87.1 to 89.9%.

In the touch sensor of the present invention, the electrode layer may have an aperture ratio of 30 to 70%.

In the touch sensor of the present invention, the electrode layer may have a resistance of 14 to 33 $\Omega/\square$.

A window laminate according to the present invention may include the touch sensor described above and a window layer coupled to one surface of the touch sensor.

The window laminate according to the present invention may further include a wear-resistant layer laminated on an outermost surface of the window layer on a viewer side.

The window laminate according to the present invention may further include a hard coating layer laminated between the window layer and the wear-resistant layer.

An image display device according to the present invention may include the touch sensor described above and a display panel coupled to one surface of the touch sensor.

Advantageous Effects

The touch sensor of the present invention having such a configuration can satisfy low resistance and high transmittance at the same time by increasing the aperture ratio by forming a plurality of through-holes while using an OMO laminate as an electrode layer.

The touch sensor of the present invention may block or minimize the moire phenomenon by forming and arranging through-holes having the same shape and spacing.

In addition, the touch sensor of the present invention can be easily applied to a large area display.

DESCRIPTION OF DRAWINGS

FIGS. 1A to 1C are a plan view, a partial plan view, and a cross-sectional view illustrating a touch sensor according to the present invention, respectively.

FIGS. 2 to 4 are partial plan views illustrating modifications of through-holes in a touch sensor according to the present invention.

FIGS. 5A and 5B are a partial plan view and a cross-sectional view of a case in which electrode layers are formed on the same plane in a touch sensor according to the present invention.

FIG. 6 is an exploded perspective view of a case in which electrode layers are formed on different planes in a touch sensor according to the present invention.

BEST MODE

Hereinafter, the present invention will be described in more detail with reference to the accompanying drawings.

FIGS. 1A to 1C are a plan view, a partial plan view, and a partial cross-sectional view illustrating a touch sensor according to the present invention, respectively.

As shown in FIGS. 1A to 1C, the touch sensor according to the present invention may include a base layer 100, an electrode layer 200, and so on.

The base layer 100 is a substrate on which the electrode layer 200 is formed, and may be composed of a base film, a laminate of a separation layer/a protective layer, or the like.

As the base layer 100, a flexible base film may be used, which may be composed of, for example, cyclo-olefin polymer (COP), polycarbonate, polyethylene terephthalate (PET), polymethyl methacrylate, polyimide, polyethylene naphthalate, polyethersulfone, etc.

The base layer 100 may be composed of a laminate of a separation layer and a protective layer in the case of manufacturing a touch sensor by a transfer method. The separation layer may be composed of an organic polymer film, for example, polyimide, polyvinyl alcohol, polyamic acid, polyamide, polyethylene, polystyrene, polynorbornene, etc. The protective layer includes at least one of an organic insulation layer and an inorganic insulation layer, and may be formed through coating/curing or deposition.

The base layer 100 may be made of glass, plastic, or the like, in addition to a flexible base film or a laminate of a separation layer/a protective layer.

The electrode layer 200 is formed on the base layer 100 to sense an external touch, and may be configured by arranging a plurality of electrode cells along the X-axis and Y-axis. The X-axis electrode cell and the Y-axis electrode cell may be formed on the same plane or separated into upper and lower layers. When formed on the same plane, a bridge for connecting the X-axis electrode cells or the Y-axis electrode cells may be additionally provided. The X-axis electrode cells or the Y-axis electrode cells may have spacing, that is, a pitch, in the range of 1 to 5 mm, and the pitch may be appropriately changed according to the required resolution.

As the electrode layer 200, a translucent OMO (Oxide/Metal/Oxide) laminate including a conductive metal layer may be used. The OMO laminate may include a first transparent oxide layer 210, a conductive metal layer 220, and a second transparent oxide layer 230.

The first transparent oxide layer 210 is formed on the base layer 100. The first transparent oxide layer 210 may have a thickness of 20 to 50 nm. If the thickness of the first transparent oxide layer 210 is less than 20 nm, a barrier function for organic materials may not be sufficiently implemented. If the thickness of the first transparent oxide layer 210 exceeds 50 nm, resistance may increase. The first transparent oxide layer 210 may preferably have relatively strong chemical resistance compared to the conductive metal layer 220 and the second transparent oxide layer 230.

The first transparent oxide layer may be composed of a metal oxide, for example, a conductive oxide such as indium tin oxide (ITO), indium zinc oxide (IZO), aluminum zinc oxide (AZO), zinc oxide (ZnOx), titanium oxide (TiO$_2$), aluminum oxide (Al$_2$O$_3$). In addition, indium zinc tin oxide (IZTO), indium oxide (InOx), tin oxide (SnOx), cadmium tin oxide (CTO), gallium-doped zinc oxide (GZO), zinc tin oxide (ZTO), indium gallium oxide (IGO) or the like, or a combination of two or more thereof may also be used.

The conductive metal layer 220 may be formed on the first transparent oxide layer 210. The conductive metal layer 220 may have a thickness of 3 to 20 nm, preferably 8 to 12 nm. If the thickness of the conductive metal layer 220 is less than 3 nm, grains may not be properly formed, and thus optical characteristics may deteriorate. If the thickness of the conductive metal layer 220 exceeds 20 nm, the flexible characteristics of the touch sensor may deteriorate.

The conductive metal layer 220 may be made of silver (Ag), a silver alloy, copper (Cu), a copper alloy, or the like. In addition, a metal such as gold (Au), aluminum (Al), platinum (Pt), palladium (Pd), chromium (Cr), tungsten (W), titanium (Ti), tantalum (Ta), iron (Fe), cobalt (Co), nickel (Ni), zinc (Zn), tellurium (Te), vanadium (V), niobium (Nb), molybdenum (Mo), an alloy of these metals (for example, silver-palladium-copper (APC)), a nanowire of a metal or an alloy, and the like may be used.

The conductive metal layer 220 may be configured in a mesh pattern, and the mesh pattern may include a net or honeycomb shape.

The second transparent oxide layer 230 is formed on the conductive metal layer 220. Like the first transparent oxide layer 210, the second transparent oxide layer 230 may have a thickness of 20 to 50 nm. The second transparent oxide layer 230 may be composed of a conductive oxide such as indium tin oxide (ITO), indium zinc oxide (IZO), aluminum zinc oxide (AZO), zinc oxide (ZnOx), titanium oxide (TiO$_2$), aluminum oxide (Al$_2$O$_3$). In addition, indium zinc tin oxide (IZTO), indium oxide (InOx), tin oxide (SnOx), cadmium tin oxide (CTO), gallium-doped zinc oxide (GZO), zinc tin oxide (ZTO), indium gallium oxide (IGO) or the like, or a combination of two or more thereof may also be used. The second transparent oxide layer 230 may be made of the same material as the first transparent oxide layer 210 or made of a different material within the above material range.

The first transparent oxide layer 210, the conductive metal layer 220, and the second transparent oxide layer 230 constituting the electrode layer 200 may be formed by thin film deposition techniques such as physical vapor deposition (PVD) or chemical vapor deposition (CVD). When forming into a mesh pattern, photolithography or the like can be used.

In the electrode layer 200, a plurality of through-holes H11 may be formed throughout the OMO laminate. It may be desirable to block or minimize the visibility of the through-holes H11 by forming them in the same shape and spacing them apart at equal intervals.

As shown in FIGS. 1A to 1C, the through-hole H11 may have a rectangular shape such as a square or a rectangle.

The inside of the through-hole H11 may be filled with an insulation layer, a passivation layer, or the like. The insulation layer, the passivation layer, or the like may be formed of an inorganic oxide such as silicon oxide or a transparent organic material such as an acrylic resin.

Table 1 below shows changes in transmittance, aperture ratio, resistance, and visibility according to changes in the size and spacing of the square through-holes H11 in the touch sensor according to the present invention.

TABLE 1

| Size of through-hole (μm) | 96*96 | 165*165 | 213*213 | 252*252 | 285*285 |
|---|---|---|---|---|---|
| Spacing of through-hole (μm) | 408 | 270 | 174 | 96 | 30 |
| Transmittance (%) | 85.7 | 87.1 | 88.5 | 89.9 | 91.3 |
| Aperture ratio (%) | 10 | 30 | 50 | 70 | 90 |
| Resistance (Ω/□) | 11 | 14 | 20 | 33 | 100 |
| Visibility | Δ | ○ | ○ | ○ | ○ |

As shown in Table 1 above, the transmittance and aperture ratio that simultaneously satisfy the condition of not exceeding the maximum allowable resistance value of 35Ω/□ without visibility problems are in the range of 87.1 to 89.9% and 30 to 70%, respectively. Therefore, when forming the through-hole H11 in the present invention, satisfying the transmittance of 87.1 to 89.9% and the aperture ratio of 30 to 70% may have technical significance. In this case, the resistance is in the range of 14-33 Ω/□.

FIGS. 2 to 4 are partial plan views illustrating modifications of through-holes in a touch sensor according to the present invention.

As shown in FIG. 2, through-holes H21 and H22 may include a main through-hole H21 and an auxiliary through-hole H22.

Since the main through-hole H21 has the same shape as the through-hole H11 shown in FIG. 1B, a detailed description will be replaced with the related description of FIG. 1B.

The auxiliary through-hole H22 may be formed to be spaced outward from the main through-hole H21. The auxiliary through-hole H22 may have a linear shape intermittently surrounding the main through-hole H21, for example, a slit shape.

As shown in FIG. 3, a through-hole H31 may have a rectangular shape such as a square or a rectangle, but may be rotated in one direction. The through-hole H31 may be formed in a shape in which edges are curved like a wave.

As shown in FIG. 4, through-holes H41 and H42 may include a main through-hole H41 and an auxiliary through-hole H42 similar to those in FIG. 2. The through-holes H41 and H42 may be rotated in one direction and have curved edges similar to those in FIG. 3.

In addition, although not shown, through-holes may be configured in a curved shape such as a circular shape or an elliptical shape. In this case, linear, for example, slit-shaped auxiliary through-holes may further be formed outside the curved through-hole to intermittently surround the curved through-hole similar to those in FIGS. 2 and 4, In addition, although the rectangular through-holes are exemplified in FIGS. 2 to 4, it is not limited thereto, and other polygonal through-holes such as triangles, pentagons, and hexagons may be used. Here again, linear, for example, slit-shaped auxiliary through-holes intermittently surrounding the polygonal through-hole may further be formed outside the polygonal through-hole similar to those in FIGS. 2 and 4.

FIGS. 5A and 5B are a partial plan view and a cross-sectional view of a case in which electrode layers are formed on the same plane in a touch sensor according to the present invention.

As shown in FIGS. 5A and 5B, an electrode layer 200 is composed of an X-axis electrode cell X1 arranged and connected along the X-axis and a Y-axis electrode cell Y1 arranged and connected along the Y-axis, which may be formed on the same plane on a base layer 100.

The through-holes H51 and H52 may be formed to have the same shape and the same spacing in the X-axis electrode cell X1 and the Y-axis electrode cell Y1.

A bridge B may connect the X-axis electrode cells X1 and may be insulated from the Y-axis electrode cell Y1 by an insulation layer 320. When the through-hole H52 is formed in the bridge B area, the bridge B may be separated into two sub-bridges B1 and B2 bypassing the through-hole H52.

FIG. 6 is an exploded perspective view of a case in which electrode layers are formed on different planes in a touch sensor according to the present invention.

As shown in FIG. 6, an electrode layer 200 is composed of an X-axis electrode cell X2 arranged and connected along the X-axis and a Y-axis electrode cell Y2 arranged and connected along the Y-axis on different planes, which are separated into an upper layer and a lower layer with an insulation layer 330 interposed in between.

In the X-axis electrode cell X2 of the lower layer, through-holes H61 may be formed with the same shape and spacing along the region forming the X-axis electrode cell X2.

The insulation layer 330 inserted between the X-axis electrode cell X2 of the lower layer and the Y-axis electrode cell Y2 of the upper layer may have a lower surface protrusion P1 inserted into the through-hole H61 of the X-axis electrode cell X2 on the lower surface and an upper surface protrusion P2 inserted into the through-hole H62 of the Y-axis electrode cell Y2 on the upper surface.

In the Y-axis electrode cell Y2 of the upper layer, through-holes H62 may be formed with the same shape and spacing along the region forming the Y-axis electrode cell Y2. The through-hole H62 of the Y-axis electrode cell Y2 may be disposed not to overlap with the through-hole H61 of the X-axis electrode cell X2. The upper surface protrusion P2 of the insulation layer 330 may be inserted into the through-hole H62 of the Y-axis electrode cell Y2.

In the embodiment of FIG. 6, the X-axis electrode cell X2 and the Y-axis electrode cell Y2 are formed on different planes. As shown, the through-hole H61 formed in the X-axis electrode cell X2 and the through-hole H62 formed in the Y-axis electrode cell Y2 are combined so that the through-holes may appear to be formed to have the same shape and spacing throughout the entire horizontal area of the electrode layer 200. Here, in the portion where the X-axis electrode cell X2 and the Y-axis electrode cell Y2 overlap in plan view, two through-holes, the through-hole H61 of the X-axis electrode cell X2 and the through-hole H62 of the Y-axis electrode cell Y2 may overlap in plan view.

The touch sensor according to the present invention may constitute a laminate by stacking a window layer on one surface. The window layer may include a transparent film, a polarization layer, a decorative layer, and the like.

The laminate according to the present invention may include a wear-resistant layer on the outermost surface of the viewer side.

For example, the wear-resistant layer may be formed on the viewer-side surface of the hard coating layer to improve wear resistance or prevent contamination by sebum or the like. Here, the hard coating layer may be formed on the window layer.

The wear-resistant layer may include a structure derived from a fluorine compound. The fluorine compound may preferably have a silicon atom and have a hydrolyzable functional group such as an alkoxy group or a halogen on the silicon atom.

The hydrolyzable functional group can form a coating film through a dehydration condensation reaction and can also improve the adhesion of the wear-resistant layer by reacting with active hydrogen on the surface of the substrate.

In addition, when the fluorine compound has a perfluoroalkyl group or a perfluoropolyether structure, preferable water repellency may be imparted. A fluorine-containing polyorganosiloxane compound having a perfluoropolyether structure and a long-chain alkyl group having 4 or more carbon atoms may be particularly preferred.

As the fluorine compound, two or more types of compounds may be used. It may be preferable to further include a fluorine-containing organosiloxane compound including an alkylene group having 2 or more carbon atoms and a perfluoroalkylene group.

The thickness of the wear-resistant layer may be, for example, 1 to 20 nm. In addition, the wear-resistant layer has water repellency, and may have a water contact angle of, for example, 110 to 125°.

The contact angle hysteresis and dynamic contact angle measured by the sliding contact angle measurement method may be 3 to 20° and 2 to 55°, respectively.

Further, the wear-resistant layer may contain various additives such as silanol condensation catalysts, antioxidants, corrosion inhibitors, ultraviolet absorbers, light stabilizers, antibacterial agents, deodorants, pigments, flame retardants, antistatic agents, etc. within a range that does not impair the effect of the present invention.

A primer layer may be formed between the wear resistance layer and the hard coating layer. As the primer, for example, an ultraviolet curing agent, a heat curing agent, a moisture curing agent, or a two-component curing agent epoxy-based compound may be used.

As the primer, polyamic acid may be used or a silane coupling agent may be used. The thickness of the primer layer may be, for example, 0.001 to 2 μm.

A method of laminating the wear-resistant layer on the hard coating layer is as follows. After forming the primer layer by applying, drying, and curing a primer on the hard coating layer as necessary, a composition containing a fluorine-based compound (wear-resistant coating composition) may be applied and dried to form the wear-resistant layer. As the application method, for example, a dip coating method, a roll coating method, a bar coating method, a spin coating method, a spray coating method, a die coating method, a gravure coating method, or the like may be used.

In addition, before applying the primer or the wear-resistant layer coating composition, it may be preferable to subject the application surface to a hydrophilic treatment such as primer treatment, corona treatment, or ultraviolet treatment.

The laminate of the wear-resistant layer and the hard coating layer may be directly formed on the window, or it may be laminated on a separate transparent substrate and then bonded to the window using an adhesive or a pressure sensitive adhesive.

The touch sensor according to the present invention may constitute an image display device by stacking a display panel on one surface. The display panel may include a liquid crystal display panel, a plasma panel, an electroluminescence panel, an organic light emitting diode panel, and the like.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

| Description of reference numerals | |
|---|---|
| 100: base layer | 200: electrode layer |
| 210: first transparent oxide layer | 220: conductive metal layer |
| 230: second transparent oxide layer | 310, 320, 330: insulation layer |
| H11, H21, H22, H31, H31, H42, H51, H52, H61, H62: through-hole | |
| B, B1, B2: bridge | P1, P2: lower/upper surface protrusion |
| X1, X2: X-axis electrode cell | Y1, Y2: Y-axis electrode cell |

The invention claimed is:

1. A touch sensor comprising:
a base layer; and
an electrode layer including a first transparent oxide layer formed on the base layer, a conductive metal layer formed on the first transparent oxide layer, and a second transparent oxide layer formed on the conductive metal layer and having a plurality of through-holes with same shape and spacing,
wherein the electrode layer has an aperture ratio of 30 to 70%, and wherein the electrode layer has a resistance of 14 to 33Ω/□.

2. The touch sensor according to claim 1, wherein the through-holes has a polygonal or curved shape.

3. The touch sensor according to claim 2, wherein, when the through-holes have a polygonal shape, an edge of the polygon is bent.

4. The touch sensor according to claim 1, wherein the through-holes include:
a curved or polygonal main through-hole; and
a linear auxiliary through-hole intermittently surrounding the main through-hole outside the main through-hole.

5. The touch sensor according to claim 1, wherein the electrode layer includes:
a first electrode layer having a plurality of first through-holes formed on the base layer and having same shape and spacing;
an insulation layer formed on the first electrode layer; and
a second electrode layer having a plurality of second through-holes formed on the insulation layer and having same shape and spacing but not overlapping the first through-holes.

6. The touch sensor according to claim 5, wherein the insulation layer fills the first through-holes and the second through-holes.

7. The touch sensor according to claim 5, wherein portions of the first through-holes and the second through-holes overlap in a region where the first electrode layer and the second electrode layer intersect.

8. The touch sensor according to claim 1, wherein the electrode layer has a transmittance of 87.1 to 89.9%.

9. A laminate comprising:
the touch sensor according to claim 1; and
a window layer coupled to one surface of the touch sensor.

10. The laminate according to claim 9, further comprising a wear-resistant layer laminated on an outermost surface of the window layer on a viewer side.

11. The laminate according to claim 10, further comprising a hard coating layer laminated between the window layer and the wear-resistant layer.

12. An image display device comprising:
the touch sensor according to claim 1; and
a display panel coupled to one surface of the touch sensor.

* * * * *